United States Patent [19]

Zappa et al.

[11] Patent Number: 4,473,688

[45] Date of Patent: Sep. 25, 1984

[54] HIGH-TOUGHNESS THERMOPLASTIC POLYAMIDE COMPOSITION

[75] Inventors: Alessandro Zappa, Villasanta; Nicola Di Donato, Pisticci Scalo, both of Italy

[73] Assignee: ANIC S.p.A., Palermo, Italy

[21] Appl. No.: 468,544

[22] Filed: Feb. 22, 1983

[30] Foreign Application Priority Data

Feb. 23, 1982 [IT] Italy ................ 19793 A/82

[51] Int. Cl.$^3$ ............... C08F 22/00; C08L 77/00
[52] U.S. Cl. .................. 525/432; 528/292
[58] Field of Search .......................... 525/432

[56] References Cited

U.S. PATENT DOCUMENTS 3,636,135  1/1972  Garforth et al. ............... 525/432
4,105,640  8/1978  Fortuna ............................ 525/292

FOREIGN PATENT DOCUMENTS 738308   2/1970  Belgium ........................ 525/432
972896   8/1975  Canada ......................... 525/432
2259104  2/1972  Fed. Rep. of Germany ...... 260/857

Primary Examiner—John C. Bleutge
Assistant Examiner—A. L. Carrillo
Attorney, Agent, or Firm—Hedman, Gibson, Costigan & Hoare

[57] ABSTRACT

A high-toughness thermoplastic polyamide composition resistant to impact even at low temperature, formed from polyamides of type 6 or 66 in mixture with alternating elastomer copolyesteramides in a quantity of between 3 and 10% and preferably between 5 and 7% by weight.

9 Claims, No Drawings

HIGH-TOUGHNESS THERMOPLASTIC POLYAMIDE COMPOSITION

This invention relates to a new high-toughness thermoplastic polyamide composition of high impact resistance, particularly at low temperature, constituted by polyamides, such as nylon 6 or 66, in mixture with elastomer copolyesteramides formed from recurring segments of long-chain diesteramides of general formula

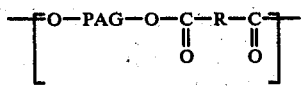

and from recurring segments of short-chain diesteramides of general formula

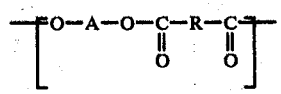

in which PAG indicates a bivalent radical deriving from a polyoxyalkyleneglycol of molecular weight between 400 and 3,500, A indicates a bivalent radical deriving from alpha, omega-dihydroxyalkanes of molecular weight less than 2500, and R indicates a bivalent radical deriving from a diesterdiamide of general formula

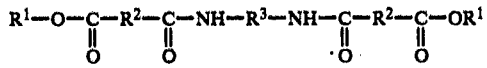

in which $R^1$ is an alkyl radical containing 1 to 8 carbon atoms, an aryl radical containing 6 to 10 carbon atoms, or an alicyclic radical from $C_4$ to $C_{10}$, and $R^2$ and $R^3$, which can be the same or different, are bivalent hydrocarbon radicals from $C_2$ to $C_{30}$, said copolyesteramides being present in the composition in a quantity of between 3 and 10% by weight, and preferably between 5 and 7%. Plastics materials of the polyamide type, such as nylon 6 and 66, are known to possess a range of characteristics (such as rigidity, heat resistance etc.) which enable them often to be used as a replacement for metals. They thus constitute an excellent engineering material.

However, they are lacking in other aspects, particularly with regard to impact strength, especially in the non-moist state or at temperatures lower than ambient temperature, so that they are not always suitable for replacing metals.

It has been sought in various ways to obviate this drawback, in particular by incorporating plastics material in the form of another polymer which is immiscible with the polyamide and which has elastomer characteristics so as to improve the toughness of the basic polyamide.

The impact-resisting material can be incorporated into the polyamide either chemically or simply by mechanical means.

Mechanical mixing is carried out generally by simultaneously extruding the two materials, which thus become mixed and amalgamated, and are extruded in the form of granules of homogeneous composition. In the chemical method, it is possible during mixing to attach grafting promoters, which lead to the formation of chemical bonds between the functional groups of the two mixed polymers. Thus for example, acrylic elastomers have been attached to polyamides by grafting the reactive group of the acrylic polymer to the terminal amide groups of nylon, as described in U.S. Pat. No. 3,796,711; again, polyamides have been mixed in a molten state with grafted acrylic/styrene/acrylonitrile elastomer esters, as described in Belgian Pat. No. 831,600, and have also been mixed with thermoplastic polyurethane elastomers (Japanese Patent Application No. 139,844), with cross-linked nitrile rubbers (Belgian Pat. No. 851,985), with a very wide range of flexible condensation polymers of particular particle sizes (U.S. Pat. No. 4,174,358), and with modified olefin rubbers as described in Japanese Pat. No. 120,762/78.

However, satisfactory results have not always been obtained, either with regard to the permanence of the impact-resistant characteristics of the mixtures, or with regard to the durability of the homogeneousness of said mixtures.

In particular, the inadequacy of the proposed methods has been demonstrated in terms of the rigidity of the final polymers and the maintaining of impact-resistant characteristics at low temperature. We have attempted to make mixtures of polyamides with other thermoplastic materials such as low-density polyethylene possibly containing elastomers, and with high-density polyethylene/ethylene-propylene-diene elastomer mixtures, but it was not possible to obtain a permanent result because the mixture gave rise to delamination of the test pieces and of the moulded articles.

It has now been found, and constitutes the subject matter of the present invention, that by mixing with a polyamide a relatively small quantity of a copolyesteramide elastomer of the type described in the U.S. Pat. No. 4,105,640, which are derived from an aryl acid, a diamine and a diol in particular that obtained by the copolymerisation of hexamethylenediamine with dimethylterephthalate followed by condensing the polymer obtained in this manner with hexanediol and polytetrahydrofuran (polytetramethyleneglycol), of two different hardnesses, the quantity being variable and preferably less than 10% of the polyamide, a thermoplastic composition is obtained which preserves the positive technical characteristics of polyamides, but possesses superior impact-resistance properties, these properties being maintained at low temperature, such characteristics being required in particular for components for automobile use, for protective helmets etc.

The two different types of polymer were mixed in a simple mechanical mixer in the form of a single-screw extruder of diameter 45 mm and compression ratio 1:3, at a temperature of between 230° and 250° C. and a speed of 75 r.p.m.

Data are given hereinafter by way of example relating to mixtures of polyamide 6 (polycaprolactam) with elastomer copolyesteramides of the type stated heretofore, in various proportions.

For comparison purposes, mixtures of polyamide 6 with other polymers were prepared, and an evaluation was also made of the characteristics of nylon 6 as such.

Two types of nylon 6 were used, of relative viscosity ($n$) 2.7 and 3.8, corresponding respectively to molecular weights of around 18,000 and 29,000, and these were mixed with copolyesteramides of the type indicated heretofore, which had a hardness (measured by the Shore A method) of respectively 55 (containing 40% of flexible phase in the molecule) and 40 (containing 90% of flexible phase in the molecule).

Mixtures of nylon 6 of viscosity 3.8 with copolyesteramide of hardness 55 were prepared in the proportions 97:3 (ex. 1), 93:7 (ex. 2), 95:5 (ex. 3), 86:14 (ex. 4), and with copolyesteramide of hardness 40 in the proportions 95:5 (ex. 5) and 93:7 (ex. 6). Nylon 6 of relative viscosity 2.7 was mixed with copolyesteramide of hardness 55 in the proportions 97:3 (ex. 7), 93:7 (ex. 8), and with copolyesteramide of hardness 40 in the proportions 93:7 (ex. 9). For the comparison tests, polyamide 6 was mixed with polyethylene, both alone and containing EPDM esters, but it was not possible to then evaluate the effects thereof because the mixtures presented delamination phenomena.

It was however possible to prepare valid mixtures using commercially available products, the range of these mixtures comprising polyamide 6 with EPDM elastomers, with ethylene-vinylacetate rubber, with ethylene-ethylacrylate rubbers and with ionomer polyethylene. Test pieces were prepared from the available mixtures for subjection to tensile, bending and impact tests, in accordance with ASTM and ISO standards as indicated hereafter.

The results obtained are recorded in the table, which shows the significant characteristics of mixtures of polyamides made impact-resistant (dry product).

From an examination of the results given in the table, it can be seen that polyamide as such has excellent rigidity characteristics but very poor elastic characteristics. In this respect, it has a very low ultimate elongation, and is extremely fragile even at ambient temperature.

In the case of the other mixtures, even where for the same rigidity the elasticity is improved, there is still poor impact resistance at low temperature, except in the case of Zytel ST 801 (a commercial polyamide), which however has almost totally lost the characteristics necessary in a plastics material for engineering uses (modulus 4,800), and has become rather similar to an actual rubber.

Only the mixtures of polyamides of type 6 with copolyesteramide according to the present invention show good impact strength even at low temperature.

The positive effect of the copolyesteramide in the preferred percentages of 5 to 7% with respect to the polyamide is apparent even on mixtures of polyamides with other impact-resistant substances as shown in examples 17 and 18, in which it is added to a polyamide 6 to which ionomer polyethylene has been added.

TABLE

| Ex. No. | Type of mixture | % of components | Bending modulus at 23° C., kg/cm² | Ultimate elongation % (at 23° C.) | Impact strength (falling body - Joules) and percentage of test piece fractures | | | |
|---|---|---|---|---|---|---|---|---|
| | | | | | at ambient temperature | | at 40° C. | |
| | | | | | No. fractures | Joules | No. fractures | Joules |
| 1 | PA6-TROPEA 55 | 97/3 | 24,000 | >200 | None up to | 100 | 60% | ˙5 |
| 2 | PA6-TROPEA 55 | 93/7 | 22,500 | >200 | None up to | 100 | 20% | ˙5 |
| 3 | PA6-TROPEA 55 | 95/5 | 23,000 | >200 | None up to | 100 | 25% | ˙5 |
| 4 | PA6-TROPEA 55 | 86/14 | 19,500 | 41 | 10% | 75 | 60% | ˙5 |
| 5 | PA6-TROPEA 40 | 95/5 | 22,500 | >200 | None up to | 110 | 30% | ˙5 |
| 6 | PA6-TROPEA 40 | 93/7 | 20,000 | >200 | None up to | 110 | 30% | ˙5 |
| 7 | PA6-TROPEA 55 | 97/3 | 24,200 | 70-80 | 10% | 75 | 60% | ˙5 |
| 8 | PA6-TROPEA 55 | 93/7 | 23,500 | >200 | None up to | 110 | 25% | ˙5 |
| 9 | PA6-TROPEA 40 | 93/7 | 21,800 | >200 | None up to | 110 | 40% | ˙5 |
| | PA6 as such | — | 26,000 | 70-80 | 100% | 30 | not measurable | |
| 10 | EN 30 (BIP) | | 22,500 | >200 | None up to | 110 | 100% | 40 |
| 11 | ZYTEL ST 801 | | 4,800 | >200 | None up to | 120 | None up to | ˙5 |
| 12 | PA6 Surlyn 1555 | 87/13 | 20,000 | >200 | None up to | 100 | 80% | 40 |
| 13 | PA6 Surlyn 1554 | 87/13 | 20,000 | >200 | None up to | 100 | 60% | ˙5 |
| 14 | PA6 Nordel 2722 | 93/7 | 24,000 | 10 | 100% | 60 | | |
| 15 | PA6 Escorene 20/28 | 87/13 | 22,000 | 15 | None up to | 75 | 100% | 40 |
| 16 | PA6 DPD 6169 | 87/13 | 20,500 | >200 | 70% | 75 | 100% | 40 |
| 17 | PA6 Surlyn 1554 TROPEA 55 | 87/8/5 | 22,500 | >200 | None up to | 120 | 10% | ˙5 |
| 18 | PA6 Surlyn 1554 TROPEA 55 | 87/8/5 | 22,500 | >200 | None up to | 120 | 15% | ˙5 |
| ANALYSIS METHOD USED | | | ASTM D790 | ASTM D638 | ISO DP 6603 | | | |

In the table of the previous pages, the polyamide 6 (PA6) of examples 1 to 6 and 12 to 17 has a relative viscosity of 3.8, and that of examples 7 to 9 and 13 has a relative viscosity of 2.7. TROPEA is the commercial name of the copolyesteramide elastomer stated in the patent text, and having a Short A hardness of 40 and 55 respectively. Zytel ST801 is an impact-resistant composition of the firm Du Pont, which is based on nylon 6 and is on unknown composition. EN 30 is a polyamide 6 of the firm British Industrial Plastics, which is made impact-resistant by 12-15% of ionomer polymer. Surlyn is the commercial name of the ionomer polyethylene of the firm Du Pont. Nordel is the commercial name of the ethylene-propylene-diene elastomers of the firm Du Pont. Escorene is the commercial name of an ethylene-vinylacetate copolymer of the firm Exxon. DPD is the symbol of an ethylene-ethylacrylate elastomer of the firm Union Carbide.

We claim:

1. A high-toughness thermoplastic polyamide comprising at least one polyamide 6 or 66 and between 3 and 10% by weight of at least one alternating elastomer copolyesteramide derived from an aryl polycarboxylic acid, a diamine and a diol.

2. A composition as claimed in the preceding claim, wherein the copolyesteramide content varies between 5 and 7% by weight.

3. A composition as claimed in claim 1, wherein the elastomer copolyesteramide is formed from recurring segments of a long-chain diesteramide of the general formula

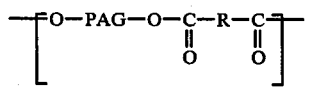

and from recurring segments of a short-chain diesteramide of the general formula

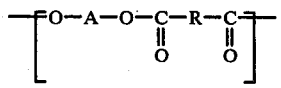

in which PAG indicates a bivalent radical derived from a polyoxyalkyleneglycol of molecular weight between 400 and 3,500, A indicates a bivalent radical derived from alpha, omega-dihydroxyalkanes of molecular weight less than 2500, and R indicates a bivalent radical derived from a diesterdiamide of the general formula

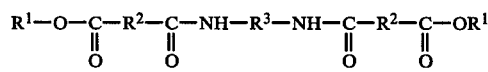

in which $R^1$ is an alkyl radical containing 1 to 8 carbon atoms, an aryl radical containing 6 to 10 carbon atoms, or an alicyclic radical from $C_4$ to $C_{10}$, and $R^2$ and $R^3$, which can be the same or different, are aryl radicals.

4. A high-toughness thermoplastic polyamide composition which comprises polyamide 6 and from 5 to 7% by weight of an elastomeric copolyesteramide that is derived from copolymerization of hexamethylene diamine with dimethylterephthalate followed by condensation of the polymer thus obtained with hexanediol and polytetramethyleneglycol.

5. A method of imparting impact resistance to a member of the group consisting of polyamide 6 and polyamide 66 which comprises adding an amount of an alternating elastomer copolyesteramide.

6. A method as defined in claim 5 wherein the elastomer copolyesteramide is formed from recurring segments of a long-chain diesteramide of the general formula

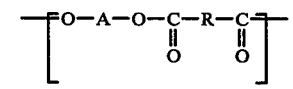

and from recurring segments of a short-chain diesteramide of the general formula

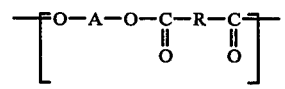

in which PAG indicates a bivalent radical derived from a polyoxyalkyleneglycol of molecular weight between 400 and 3,500, A indicates a bivalent radical derived from alpha, omega-dihydroxyalkanes of molecular weight less than 2500, and R indicates a bivalent radical derived from a diesterdiamide of the general formula

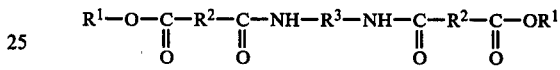

in which $R^1$ is an alkyl radical containing 1 to 8 carbon atoms, an aryl radical containing 6 to 10 carbon atoms, or an alicyclic radical from $C_4$ to $C_{10}$, and $R^2$ and $R^3$, which can be the same or different, are aryl radicals.

7. A method as defined in claim 5 wherein the member of the group is polyamide 6 and the elastomeric copolyesteramide is derived from copolymerization of hexamethylene diamine with dimethyterephtholate followed by condensation of the polymer thus obtained with hexanediol and polytetra-methyleneglycol.

8. A method as defined in claim 5 wherein the copolyesteramide comprises from 3 to 10% by weight of the composition.

9. A method as defined in claim 5 wherein the copolyesteramide comprises from 5 to 7% by weight of the composition.

* * * * *